United States Patent
Tajima et al.

(10) Patent No.: US 12,224,443 B2
(45) Date of Patent: Feb. 11, 2025

(54) SECONDARY BATTERY ELECTRODE PLATE AND SECONDARY BATTERY USING SAME

(71) Applicant: SANYO Electric Co., Ltd., Daito (JP)

(72) Inventors: Hiroyuki Tajima, Hyogo (JP); Tetsuya Sato, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 709 days.

(21) Appl. No.: 17/311,967

(22) PCT Filed: Dec. 17, 2019

(86) PCT No.: PCT/JP2019/049491
§ 371 (c)(1),
(2) Date: Jun. 8, 2021

(87) PCT Pub. No.: WO2020/130000
PCT Pub. Date: Jun. 25, 2020

(65) Prior Publication Data
US 2022/0029167 A1 Jan. 27, 2022

(30) Foreign Application Priority Data
Dec. 19, 2018 (JP) ................. 2018-236843

(51) Int. Cl.
*H01M 50/534* (2021.01)
*H01M 4/134* (2010.01)
(Continued)

(52) U.S. Cl.
CPC ........... *H01M 4/623* (2013.01); *H01M 4/134* (2013.01); *H01M 4/661* (2013.01);
(Continued)

(58) Field of Classification Search
CPC .... H01M 4/623; H01M 50/534; H01M 4/134; H01M 4/661
See application file for complete search history.

(56) References Cited

U.S. PATENT DOCUMENTS

2012/0189889 A1* 7/2012 Kim ................. H01M 10/0431
429/94
2012/0244423 A1* 9/2012 Kusukawa .......... H01M 50/186
429/178

(Continued)

FOREIGN PATENT DOCUMENTS

| JP | 6-231754 A | 8/1994 |
| JP | 11-7962 A | 1/1999 |

(Continued)

OTHER PUBLICATIONS

Extended (Supplementary) European Search Report dated Jan. 11, 2022, issued in counterpart EP Application No. 19899059.0. (9 pages).

(Continued)

*Primary Examiner* — Olatunji A Godo
(74) *Attorney, Agent, or Firm* — WHDA, LLP

(57) ABSTRACT

Provided are: a highly reliable secondary battery electrode plate; and a secondary battery using same. The electrode plate is a positive electrode plate for a secondary battery, the positive electrode plate having a metallic positive electrode core body and a positive electrode active material layer formed on both surfaces of the positive electrode core body, wherein the positive electrode plate has a first edge and a positive electrode tab protruding from the first edge, and a fluorine-containing coating is formed on the end surface of the positive electrode core body at the first edge of the positive electrode plate. The secondary battery has the positive electrode plate and a negative electrode plate.

8 Claims, 6 Drawing Sheets

(51) Int. Cl.
  *H01M 4/62*     (2006.01)
  *H01M 4/66*     (2006.01)
  *H01M 4/02*     (2006.01)
  *H01M 50/588*    (2021.01)
  *H01M 50/593*    (2021.01)

(52) U.S. Cl.
  CPC .... *H01M 50/534* (2021.01); *H01M 2004/027* (2013.01); *H01M 2004/028* (2013.01); *H01M 50/588* (2021.01); *H01M 50/593* (2021.01)

(56) References Cited

U.S. PATENT DOCUMENTS

| | | | |
|---|---|---|---|
| 2014/0011064 | A1 | 1/2014 | Matsuda et al. |
| 2015/0024243 | A1* | 1/2015 | Okuda ................ H01M 4/0404 429/94 |
| 2016/0036026 | A1 | 2/2016 | Kano et al. |
| 2017/0288220 | A1* | 10/2017 | Takei .................... H01M 4/625 |
| 2019/0267608 | A1 | 8/2019 | Choi et al. |

FOREIGN PATENT DOCUMENTS

| | | |
|---|---|---|
| JP | 2008-010854 A | 1/2008 |
| JP | 2015-99658 A | 5/2015 |
| JP | 2016-35901 A | 3/2016 |
| JP | 2016-115409 A | 6/2016 |
| WO | 2017/057762 A1 | 4/2017 |
| WO | 2018/004177 A1 | 1/2018 |

OTHER PUBLICATIONS

International Search Report dated Mar. 17, 2020, issued in counterpart International Application No. PCT/JP2019/049491. (2 pages).

English Translation of Chinese Search Report dated Dec. 20, 2023, issued in counterpart CN Patent Application No. 201980068345.1. (3 pages).

English translation of Search Report dated Jul. 23, 2024, issued in couterpart CN Application No. 201980068345.1. (3 pages).

* cited by examiner

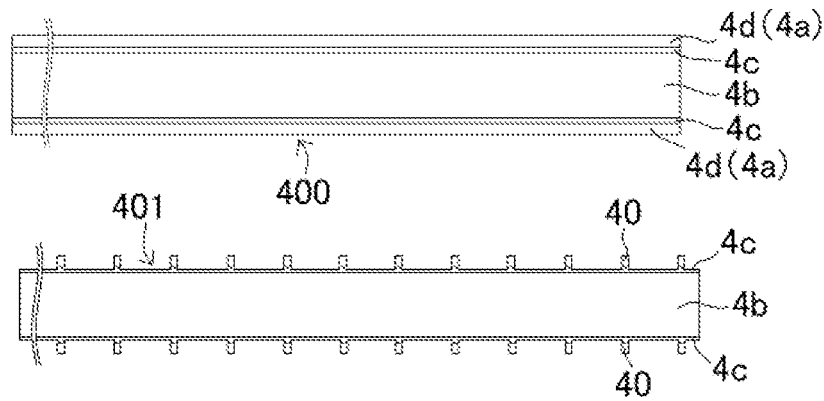
Figure 3 (a)
Figure 3 (b)
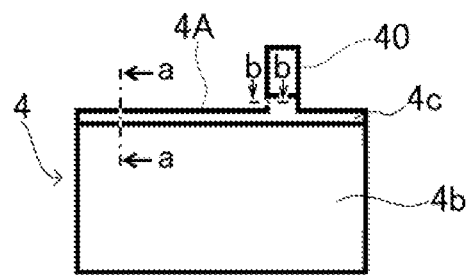
Figure 3 (c)
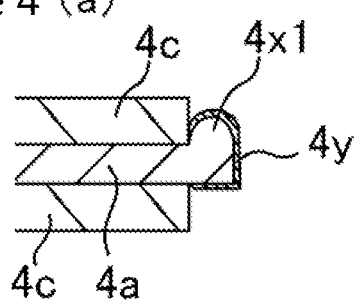
Figure 4 (a)
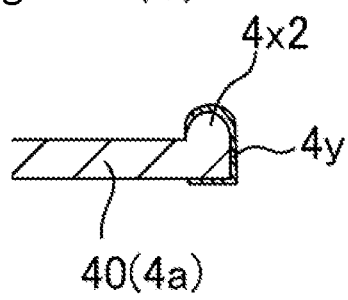
Figure 4 (b)

SECONDARY BATTERY ELECTRODE PLATE AND SECONDARY BATTERY USING SAME

TECHNICAL FIELD

The present invention relates to an electrode plate for a secondary battery and a secondary battery using the same.

BACKGROUND ART

Secondary batteries, such as alkaline secondary batteries and non-aqueous electrolyte secondary batteries, are used in the driving power sources of electric vehicles (EV) and hybrid electric vehicles (HEV or PHEV).

These secondary batteries contain an electrode assembly consisting of a positive electrode plate, a negative electrode plate, and a separator together with an electrolyte in a battery case. The battery case is composed of an exterior body having an opening and a sealing plate that seals the opening of the exterior body. A positive electrode terminal and a negative electrode terminal are attached to the sealing plate. The positive electrode terminal is electrically connected to the positive electrode plate with a positive electrode current collector therebetween, and the negative electrode terminal is electrically connected to the negative electrode plate with a negative electrode current collector therebetween.

As such a secondary battery, a secondary battery has been proposed in which a positive electrode tab group consisting of a plurality of positive electrode tabs and a negative electrode tab group consisting of a plurality of negative electrode tabs are provided at the end of the electrode assembly adjacent to the sealing plate (see Patent Literature 1).

CITATION LIST

Patent Literature

PATENT LITERATURE 1: Japanese Unexamined Patent Application Publication No. 2016-115409

SUMMARY

It is an advantage of the present invention is to provide a highly reliable secondary battery.

A secondary battery electrode plate according to one aspect of the present invention has a metal core body and an active material layer on both sides of the core body, wherein the electrode plate has a first side and a tab that protrudes from the first side, and a coating containing fluorine is formed on an end surface of the core body on the first side.

A secondary battery according to one aspect of the present invention includes the electrode plate and another electrode plate having a polarity different from that of the electrode plate.

According to the present invention, a highly reliable secondary battery can be provided.

BRIEF DESCRIPTION OF DRAWINGS

FIG. 3A is a plan view of a positive electrode original plate. FIG. 3B is a plan view of the positive electrode original plate with tabs already formed. FIG. 3C is a plan view of the positive electrode plate.

FIG. 4A is a cross-sectional view along line aa in FIG. 3C. FIG. 4B is a cross-sectional view along line bb in FIG. 3C.

DESCRIPTION OF EMBODIMENTS

The configuration of a square secondary battery 20 as a secondary battery according to the embodiment will be described below. Note that the present invention is not limited to the following embodiments.

Figure 1:
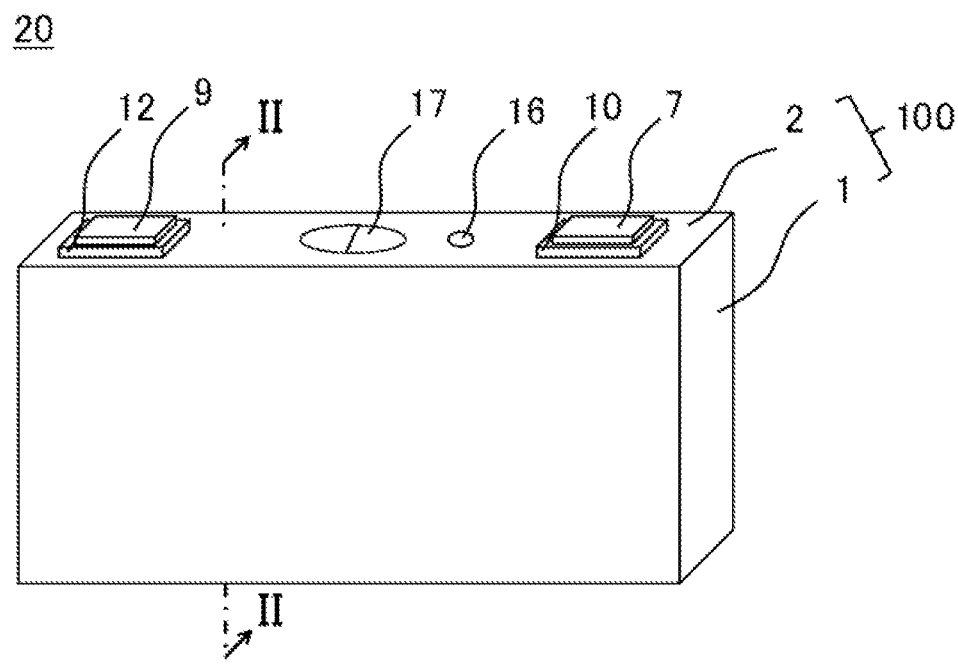
FIG. 1 is a perspective view of a secondary battery according to an embodiment.
Figure 2:
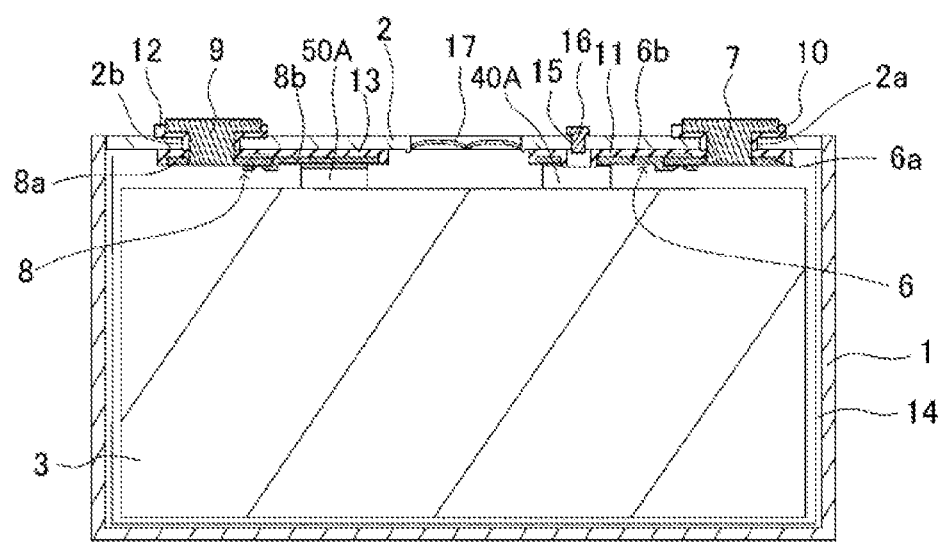
FIG. 2 is a cross-sectional view taken along line II-II in FIG. 1.

As shown in FIGS. 1 and 2, the square secondary battery 20 comprises a battery case 100 consisting of a bottomed hollow rectangular cylindrical exterior body 1 having an opening and a sealing plate 2 for sealing the opening of the square exterior body 1. The square exterior body 1 and the sealing plate 2 are preferably made of metal. An electrode assembly 3 including a positive electrode plate and a negative electrode plate is accommodated in the square exterior body 1 together with an electrolyte.

At the end of the electrode assembly 3 adjacent to the sealing plate 2, a positive electrode tab group 40A composed of a plurality of positive electrode tabs 40 and a negative electrode tab group 50A composed of a plurality of negative electrode tabs 50 are provided. The positive electrode tab group 40A is electrically connected to a positive electrode terminal 7 via a second positive electrode current collector 6b and a first positive electrode current collector 6a. The negative electrode tab group 50A is electrically connected to a negative electrode terminal 9 via a second negative electrode current collector 8b and a first negative electrode current collector 8a. The first positive electrode current collector 6a and the second positive electrode current collector 6b constitute a positive electrode current collector 6. Note that the positive electrode current collector 6 may be used as one component. The first negative electrode current collector 8a and the second negative electrode current collector 8b constitute a negative electrode current collector 8. Note that the negative electrode current collector 8 may be used as one component.

The first positive electrode current collector 6a, the second positive electrode current collector 6b, and the positive electrode terminal 7 are preferably made of metal, and more preferably made of aluminum or an aluminum alloy. A resin external insulating member 10 is disposed between the positive electrode terminal 7 and the sealing plate 2. A resin internal insulating member 11 is disposed between the first positive electrode current collector 6a and the second positive electrode current collector 6b, and the sealing plate 2.

The first negative electrode current collector 8a, the second negative electrode current collector 8b, and the negative electrode terminal 9 are preferably made of metal, more preferably copper or a copper alloy. The negative electrode terminal 9 preferably has a portion of aluminum or an aluminum alloy and a portion of copper or a copper alloy. In this case, the portion of copper or a copper alloy is preferably connected to the first negative electrode current collector 8a so that the portion of aluminum or an aluminum alloy protrudes to the outside of the sealing plate 2. A resin external insulating member 12 is disposed between the negative electrode terminal 9 and the sealing plate 2. A resin internal insulating member 13 is disposed between the first negative electrode current collector 8a and the second negative electrode current collector 8b, and the sealing plate 2.

An electrode assembly holder 14 composed of a resin sheet, which is made of resin, is disposed between the electrode assembly 3 and the square exterior body 1. The electrode assembly holder 14 is preferably formed by bending a resin insulating sheet into a bag shape or a box shape. The sealing plate 2 has an electrolytic solution injection hole 15, and the electrolytic solution injection hole 15 is sealed by a sealing member 16. The sealing plate 2 has a gas discharge valve 17 that breaks when the pressure inside the battery case 100 exceeds a predetermined value to discharge the gas inside the battery case 100 to the outside of the battery case 100.

A method of manufacturing the square secondary battery 20 and the details of each component will now be explained.

Positive Electrode Plate

The method of manufacturing the positive electrode plate will be first explained.

Preparation of Positive Electrode Active Material Layer Slurry

Lithium nickel manganese cobalt oxide as a positive electrode active material, polyvinylidene fluoride (PVdF) as a binder, a carbon material as a conductive agent, and N-methyl-2-pynolidone (NMP) as a dispersion medium are mixed so that the lithium nickel manganese cobalt oxide: PVdF: carbon material mass ratio becomes 97.5:1:1.5, thereby preparing a positive electrode active material layer slurry.

Preparation of Positive Electrode Protective Layer Slurry

Alumina powder, a carbon material as a conductive material, polyvinylidene fluoride (PVdF) as a binder, and N-methyl-2-pyrrolidone (NMP) as a dispersion medium are mixed so that the alumina powder: carbon material: PVdF mass ratio becomes 83:3:14, thereby preparing a protective layer slurry.

Formation of Positive Electrode Active Material Layer and Positive Electrode Protective Layer The positive electrode active material layer slurry and the positive electrode protective layer slurry prepared by the aforementioned method are applied to both sides of an aluminum foil as a positive electrode core body having a thickness of 15 μm with a die coater. At this time, the positive electrode active material layer slurry is applied to the center of the positive electrode core body with respect to the width direction. Further, the positive electrode protective layer slurry is applied to both ends with respect to the width direction of the region coated with the positive electrode active material layer slurry.

The positive electrode core body coated with the positive electrode active material layer slurry and the positive electrode protective layer slurry is dried to remove NMP contained in the positive electrode active material layer slurry and the positive electrode protective layer slurry. Thus, a positive electrode active material layer and a protective layer are formed. After that, the positive electrode active material layer is compressed into a positive electrode original plate 400 by passing it between a pair of press rollers.

FIG. 3A is a plan view of the positive electrode original plate 400 fabricated by the aforementioned method. A positive electrode active material layer 4b is formed on both sides of a strip-shaped positive electrode core body 4a along the longitudinal direction of the positive electrode core body 4a. In the positive electrode core body 4a, a positive electrode protective layer 4c is formed at both ends with respect to the width direction of the region where the positive electrode active material layer 4b is formed. A positive electrode core body exposed portion 4d is formed at both ends of the positive electrode original plate 400 with respect to the width direction of the positive electrode original plate 400 along the longitudinal direction. Note that the thickness of the positive electrode active material layer 4b is preferably larger than the thickness of the positive electrode protective layer 4c. The thickness of the positive electrode protective layer 4c formed on one side of the positive electrode core body is preferably 10 to 100 μm, more preferably 15 to 50 μm.

FIG. 3B is a plan view of the positive electrode original plate 401 with tabs already formed. Cutting the positive electrode core body exposed portion 4d of the positive electrode original plate 400 into a predetermined shape leaves the positive electrode original plate 401 with tabs already formed. When the positive electrode original plate 400 is cut to form tabs, the positive electrode original plate 400 is preferably cut by irradiating energy rays such as laser beams.

It is preferable to use a continuous oscillation (CW) laser for laser cutting. The output of the laser is preferably 500 W to 1200 W, more preferably 550 W to 1000 W, and even more preferably 600 W to 1000 W. The scanning speed of the laser is preferably 100 mm/s to 5000 mm/s. However, this is not necessarily the case. Note that a pulsed laser may be used instead.

In the positive electrode original plate 401 with tabs already formed, there are a plurality of positive electrode tabs 40 at both ends of the positive electrode original plate 401 with respect to the width direction with tabs already formed. Each positive electrode tab 40 is composed of a positive electrode core body exposed portion 4d. As shown in FIG. 3B, the positive electrode original plate 400 can be cut so that the positive electrode protective layer 4c remains at the base of each positive electrode tab 40 and at sides of the positive electrode original plate 401 obtained between the adjacent positive electrode tabs 40 with tabs already formed.

FIG. 3C is a plan view of the positive electrode plate 4. First, the positive electrode original plate 401 with tabs already formed is cut at the central portion with respect to the width direction along the longitudinal direction of the positive electrode original plate 401 with tabs already formed. After that, the positive electrode original plate 401 with tabs already formed is cut at predetermined intervals in the longitudinal direction of the positive electrode original plate 401 with tabs already formed, thereby fabricating the positive electrode plate 4. The positive electrode original plate 401 with tabs already formed can be cut by laser cutting, cutting using a mold or a cutter, or the like. The positive electrode original plate 401 with tabs already formed is preferably cut by a mold or a cutter.

FIG. 4A is a cross-sectional view taken along line aa in FIG. 3C, and is a cross-sectional view of the first side 4A from which the positive electrode tab 40 protrudes, in the positive electrode plate 4. FIG. 4B is a cross-sectional view taken along line bb in FIG. 3C, and is a cross-sectional view of the end of the positive electrode tab 40.

As shown in FIG. 4A, the positive electrode plate 4 has an active material layer-free portion in which the positive electrode active material layer 4b is not formed along the first side 4A in the positive electrode core body 4a. In the active material layer-free portion, a positive electrode protective layer 4c is formed adjacent to the positive electrode active material layer 4b. A protrusion 4x1 that protrudes from one side of the positive electrode core body 4a (upper side in FIG. 4A) in the thickness direction of the positive electrode core body 4a is formed at the end of the active material layer-free region. Hence, the thickness of the end of the positive electrode core body 4a on the first side 4A is larger than the thickness of the portion of the positive electrode core body 4a where the positive electrode active material layer 4b is formed on the surface. Note that the thickness of the portion of the positive electrode core body 4a where the positive electrode active material layer 4b is formed on the surface is substantially equal to the thickness of the portion of the positive electrode core body 4a where the positive electrode protective layer 4c is formed on the surface. The protrusion 4x1 is a part where the positive electrode core body 4a is melted and solidified by laser cutting. The protrusion 4x1 is likely to occur on the side of the positive electrode core body 4a irradiated with the laser beam during laser cutting.

A fluorine-containing coating 4y is formed on the end surface of the positive electrode core body 4a on the first side 4A. This makes it possible to suppress the phenomenon that the portion of the positive electrode core body 4a where the end surface is exposed comes into contact with the separator and damages the separator. Note that the coating 4y is more preferably also formed on a surface of the protrusion 4x1. Even if the end surface of the positive electrode core body 4a comes into contact with the negative electrode plate 5, the flow of a large current can be suppressed. A coating 4y is preferably formed on substantially the entire end surface of the positive electrode core body 4a on the first side 4A. For example, the coating 4y is preferably formed in a region making up 90% or more, more preferably 95% or more, still more preferably 99% or more of the total area of the end surface of the positive electrode core body 4a on the first side 4A. In the positive electrode plate 4, the coating 4y is not necessarily be formed on the end surface of the positive electrode core body 4a on the three sides other than the first side 4A.

The fluorine-containing coating 4y can be a resin film. Thus, damage to the separator can be prevented more effectively. Even if the end surface of the positive electrode core body 4a comes into contact with the negative electrode plate 5, the flow of a large current can be suppressed effectively. Besides, the coating 4y is not easily peeled off from the end surface of the positive electrode core body 4a.

Cutting the positive electrode original plate 400 can form a fluorine-containing coating 4y on the end surface of the first side 4A of the positive electrode core body 4a. For example, a resin containing molten fluorine can be applied to the end surface of the positive electrode core body 4a. It is also conceivable to irradiate a resin containing fluorine with an energy ray such as a laser beam to melt the resin, and then spray the molten resin on the end surface of the positive electrode core body 4a.

The fluorine-containing coating 4y can be defined as a coating containing aluminum fluoride. Thus, damage to the separator can be prevented more effectively. Even if the end surface of the positive electrode core body 4a comes into contact with the negative electrode plate 5, the flow of a large current can be suppressed effectively. The fluorine-containing coating 4y can be defined as a coating containing aluminum fluoride as a main component. For instance, the aluminum fluoride content in the coating 4y can be 60 mass %. The coating 4y may be made of aluminum fluoride and a resin.

When the positive electrode original plate 400 is cut, the positive electrode core body 4a made of molten aluminum or aluminum can be reacted with a gas containing fluorine to generate aluminum fluoride on the end surface of the positive electrode core body 4a. It is conceivable, for example, to laser-cut the positive electrode original plate 400 in a gas containing fluorine. Thus, a coating containing aluminum fluoride can be formed on the end surface of the positive electrode core body 4a.

As shown in FIG. 4B, the coating 4y is preferably also formed on the end surface of the positive electrode tab 40. In the positive electrode tab 40, the coating 4y is preferably formed in the width direction (end surfaces defined with respect to the horizontal direction in FIG. 3C). In the positive electrode tab 40, the coating 4y is preferably formed on the end surface defined with respect to the direction in which the positive electrode tab 40 protrudes (top surface in FIG. 3C). A protrusion 4x2 that protrudes from one side of the positive electrode core body 4a (upper side in FIG. 4B) in the thickness direction of the positive electrode core body 4a is formed at the end of the positive electrode tab 40. The coating 4y is preferably also formed on a surface of the protrusion 4x2.

The protrusion 4x1 protrudes in the direction of the thickness of the positive electrode core body 4a, from one side of the positive electrode core body 4a (upper side in FIG. 4A). Here, the height from one side of the positive electrode core body 4a (upper side in FIG. 4A) to the upper end of the protrusion 4x1 is defined as the protrusion height of the protrusion 4x1. The protrusion height of the protrusion 4x1 is preferably smaller than the thickness of the positive electrode protective layer 4c. Such a configuration makes it possible to more effectively prevent the protrusion 4x1 from coming into contact with the separator and damaging the separator. The protrusion height of the protrusion 4x1 is preferably ⅔ or less, more preferably ⅓ or less of the thickness of the positive electrode protective layer 4c. Note that the protrusion height of the protrusion 4x1 can be made larger than the thickness of the positive electrode protective layer 4c. The positive electrode protective layer 4c is not an essential component. The positive electrode protective layer 4c is not necessarily provided on the positive electrode plate 4.

Note that the protrusion height of the protrusion 4x1 is preferably ¼ or less of the thickness of the portion of the positive electrode core body 4a where the positive electrode active material layers are formed on both sides.

In the positive electrode core body 4a, on the other side (lower side in FIG. 4A) that is the side opposite to the side on which the protrusion 4x1 is formed, no protrusion protruding from the other side in the thickness direction of the positive electrode core body 4a is preferably formed. Alternatively, in the positive electrode core body 4a, on the other side (lower side in FIG. 4A) that is the side opposite to the side on which the protrusion 4x1 is formed, a protrusion that protrudes from the other side in the thickness direction of the positive electrode core body 4a is preferably formed but its protrusion height is preferably smaller than that of the protrusion 4x1. With such a configuration, short circuits between the positive electrode plate 4 and the negative electrode plate 5 can be prevented more effectively. Note that the protrusion height of the protrusion formed on the other side is preferably ⅓ or less, more preferably ⅕ or less of the protrusion height of the protrusion 4x1.

Negative Electrode Plate

A method of manufacturing a negative electrode plate will now be explained.

Preparation of Negative Electrode Active Material Layer Slurry

Graphite as a negative electrode active material, styrene-butadiene rubber (SBR) and carboxymethyl cellulose (CMC) as a binder, and water as a dispersion medium are mixed so that the graphite: SBR: CMC mass ratio becomes 98:1:1, thereby preparing a negative electrode active material layer slurry.

Formation of Negative Electrode Active Material Layer

The negative electrode active material layer slimy prepared by the aforementioned method is applied to both sides of a 8-μm-thick copper foil as the negative electrode core body with a die coater.

The negative electrode core body coated with the negative electrode active material layer slurry is dried to remove the water contained in the negative electrode active material layer slurry. Thus, the negative electrode active material layer is formed. After that, the negative electrode active material layer is compressed into the negative electrode original plate 500 by passing it between the pair of press rollers.

Figure 5:
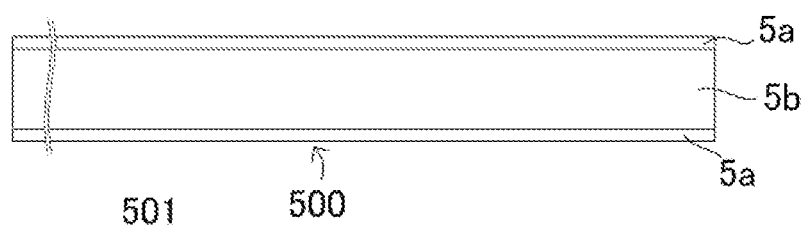
FIG. 5A is a plan view of a negative electrode original plate.
FIG. 5B is a plan view of the negative electrode original plate with tabs already formed.
FIG. 5C is a plan view of the negative electrode plate.
Figure 5:
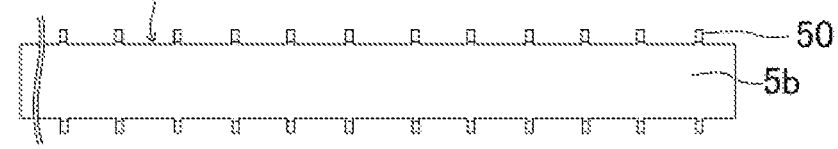
Figure 5:
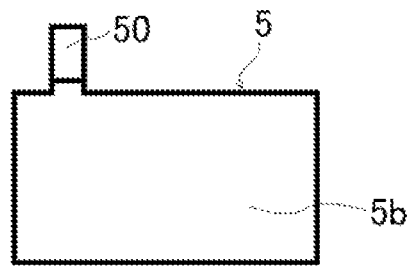

FIG. 5A is a plan view of the negative electrode original plate 500 fabricated by the aforementioned method. Negative electrode active material layers 5b are formed on both sides of a strip-shaped negative electrode core body 5a along the longitudinal direction of the negative electrode core body 5a. Negative electrode core body exposed portions 5c are formed at both ends of the negative electrode original plate 500 with respect to the width direction along the longitudinal direction of the negative electrode original plate 500.

FIG. 5B is a plan view of a negative electrode original plate 501 with tabs already formed. The negative electrode original plate 501 with tabs already formed is fabricated by cutting the negative electrode core body exposed portion 5c of the negative electrode original plate 501 with tabs already formed, into a predetermined shape. The negative electrode original plate 500 can be cut by irradiation with energy rays such as lasers, a mold, a cutter, or the like. As for the negative electrode original plate 501 with tabs already formed, a plurality of negative electrode tabs 50 are formed, along the longitudinal direction of the negative electrode original plate 501 with tabs already formed, at both ends with respect to the width direction of the negative electrode original plate 501 with tabs already formed. Note that each negative electrode tabs 50 consists of a negative electrode core body exposed portion 5c. The negative electrode original plate 500 is preferably cut by irradiation with energy rays to form the negative electrode tabs 50.

FIG. 5C is a plan view of the negative electrode plate 5. First, the negative electrode original plate 501 with tabs already formed is cut at the central portion with respect to the width direction along the longitudinal direction of the negative electrode original plate 501 with tabs already formed. After that, the negative electrode original plate 501 with tabs already formed is cut at predetermined intervals in the longitudinal direction of the negative electrode original plate 501 with tabs already formed, thereby fabricating the negative electrode plate 5.

Fabrication of Electrode Assembly

Figure 6:
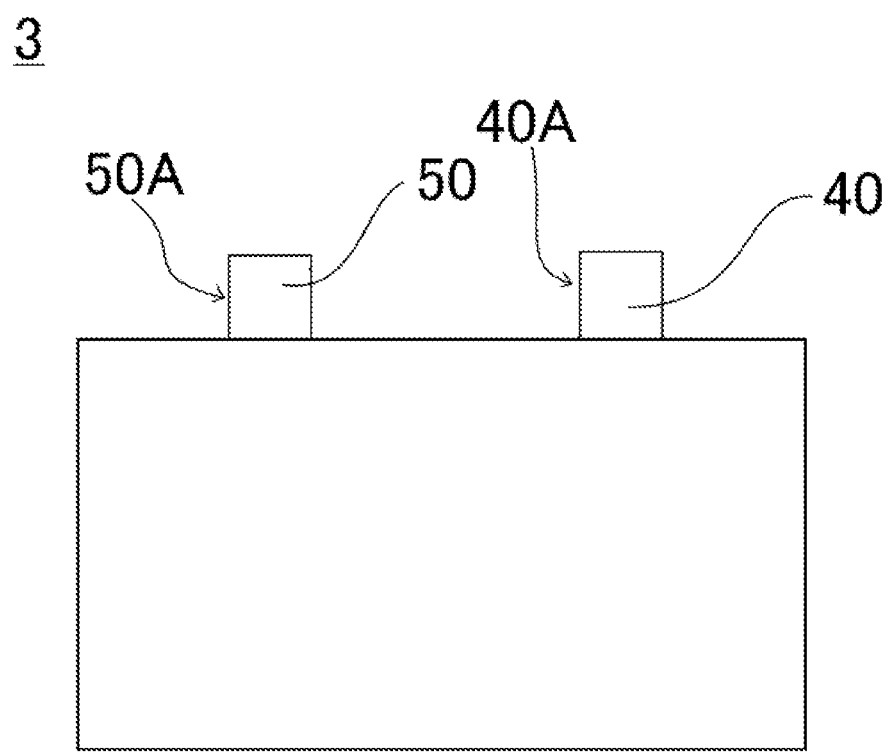
FIG. 6 is a plan view of an electrode assembly according to the embodiment.

The positive electrode plate 4 and the negative electrode plate 5 fabricated by the aforementioned method are laminated with a separator therebetween, thereby manufacturing a laminated electrode assembly 3. FIG. 6 is a plan view of the electrode assembly 3. A positive electrode tab group 40A of positive electrode tabs 40 and a negative electrode tab group 50A of negative electrode tabs 50 are provided at one end of the electrode assembly 3.

Note that, when viewed in a plan view, the area of the region of the positive electrode plate 4 in which the positive electrode active material layer 4b is formed is preferably smaller than the area of the region of the negative electrode plate 5 in which the negative electrode active material layer 5b is formed. When the electrode assembly 3 is viewed in a plan view, all the regions of the positive electrode plate 4 in which the positive electrode active material layer 4b is formed are preferably located in the regions of the negative electrode plate 5 where the negative electrode active material layer 5b is formed.

In the electrode assembly 3, the end of the positive electrode protective layer 4c formed on the positive electrode tab 40 adjacent to the distal end of the positive electrode tab 40 is preferably located closer to the distal end of the positive electrode tab 40 than the side of the negative electrode plate 5 on which the negative electrode tab 50 is formed. In other words, in the negative electrode plate 5, in the region located on the side on which the negative electrode tab 50 is formed and facing the positive electrode tab 40, the positive electrode protective layer 4c resides between the positive electrode core body 4a constituting the positive electrode tab 40 and the negative electrode plate 5. This prevents short circuits between the positive electrode plate 4 and the negative electrode plate 5 more effectively.

It is preferable to use a porous film of polyolefin as the separator. It is more preferable to use a separator in which a heat-resistant layer containing ceramic is formed on the surface of the porous film of polyolefin.

Connection Between Current Collector and Tabs

Figure 7:
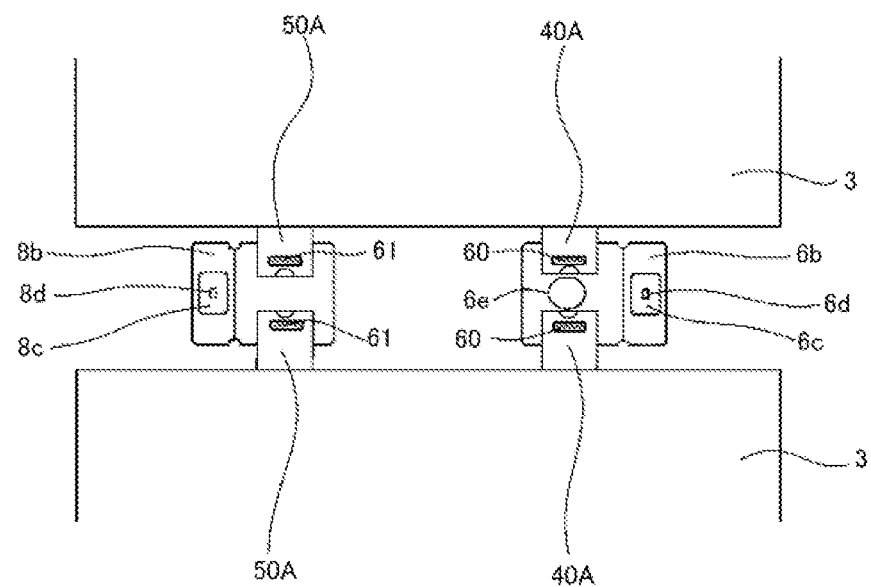
FIG. 7 is a diagram showing a state in which a positive electrode tab group is connected to a second positive electrode current collector and a negative electrode tab group is connected to a second negative electrode current collector.

As shown in FIG. 7, the positive electrode tab groups 40A of the two electrode assemblies 3 are connected to the second positive electrode current collector 6b, and the negative electrode tab groups 50A of the two electrode assemblies 3 are connected to the second negative electrode current collector 8b. The positive electrode tab groups 40A are welded and joined to the second positive electrode current collector 6b, thereby forming a welded connection portion 60. The negative electrode tab groups 50A are welded and joined to the second negative electrode current collector 8b, thereby forming a welded connection portion 61.

A thin portion 6c is formed in the second positive electrode current collector 6b, and a current collector opening 6d is formed in the thin portion 6c. In the thin portion 6c, the second positive electrode current collector 6b is connected to the first positive electrode current collector 6a. In the second positive electrode current collector 6b, a current collector through hole 6e is formed in a position facing the electrolytic solution injection hole 15 of the sealing plate 2.

A thin portion 8c is formed in the second negative electrode current collector 8b, and a current collector opening 8d is formed in the thin portion 8c. In the thin portion 8c, the second negative electrode current collector 8b is connected to the first negative electrode current collector 8a.

A connection between the positive electrode tab group 40A and the second positive electrode current collector 6b can be achieved by ultrasonic welding, resistance welding, laser welding, or the like.

Mounting of Components to Sealing Plate

Figure 8:
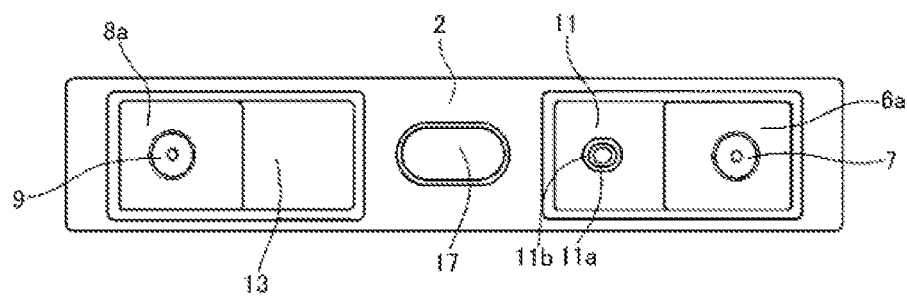
FIG. 8 is a diagram showing a surface of a sealing plate adjacent to the electrode assembly after the first positive electrode current collector and the first negative electrode current collector are attached to the sealing plate.

FIG. 8 is a diagram showing the inner side of the battery of the sealing plate 2 mounted with the components. Each component is mounted to the sealing plate 2 in the following manner.

An external insulating member 10 is located on the outer side of the battery around the positive electrode terminal insertion hole 2a of the sealing plate 2. An internal insulating member 11 and a first positive electrode current collector 6a are located on the inner side of the battery around the positive electrode terminal insertion hole 2a of the sealing plate 2. After that, the positive electrode terminal 7 is inserted from the outside of the battery into the through hole of the external insulating member 10, the positive electrode terminal insertion hole 2a of the sealing plate 2, the through hole of the internal insulating member 11, and the through hole of the first positive electrode current collector 6a, and the end of the positive electrode terminal 7 is crimped onto the first positive electrode current collector 6a. Hence, the positive electrode terminal 7 and the first positive electrode current collector 6a are fixed to the sealing plate 2. Note that the crimped portion of the positive electrode terminal 7 and the first positive electrode current collector 6a are preferably connected by welding.

An external insulating member 12 is located on the outer side of the battery around the negative electrode terminal insertion hole 2b of the sealing plate 2. An internal insulating member 13 and a first negative electrode current collector 8a are located on the inner side of the battery around the negative electrode terminal insertion hole 2b of the sealing plate 2. After that, the negative electrode terminal 9 is inserted from the outside of the battery into the through hole of the external insulating member 12, the negative electrode terminal insertion hole 2b of the sealing plate 2, the through hole of the internal insulating member 13, and the through hole of the first negative electrode current collector 8a, and the end of the negative electrode terminal 9 is crimped onto the first negative electrode current collector 8a. Hence, the negative electrode terminal 9 and the first negative electrode current collector 8a are fixed to the sealing plate 2. Note that the crimped portion of the negative electrode terminal 9 and the first negative electrode current collector 8a are preferably connected by welding.

In the internal insulating member 11, a solution injection opening 11a is provided in a portion facing the electrolytic solution injection hole 15 provided in the sealing plate 2. A tubular part 11b is provided at the edge of the solution injection opening 11a.

Connection Between First Current Collector and Second Current Collector

Figure 9:
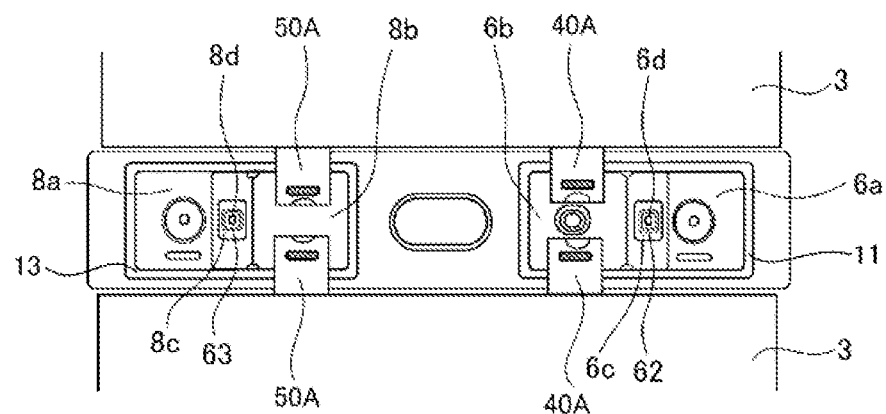
FIG. 9 is a diagram showing a surface of the sealing plate adjacent to the electrode assembly after the second positive electrode current collector is attached to the first positive electrode current collector and the second negative electrode current collector is attached to the first negative electrode current collector.

FIG. 9 shows the inside of the battery of the sealing plate 2 after the second positive electrode current collector 6b is mounted to the first positive electrode current collector 6a and the second negative electrode current collector 8b is mounted to the first negative electrode current collector 8a. The second positive electrode current collector 6b to which the positive electrode tab group 40A is connected is located on the internal insulating member 11 so that a part thereof overlaps with the first positive electrode current collector 6a. The thin portion 6c is irradiated with a laser beam, so that the second positive electrode current collector 6b and the first positive electrode current collector 6a are connected by welding, thereby forming a welded connection portion 62. The second negative electrode current collector 8b to which the negative electrode tab group 50A is connected is located on the internal insulating member 13 so that a part thereof overlaps with the first negative electrode current collector 8a. The thin portion 8c is irradiated with a laser beam, so that the second negative electrode current collector 8b and the first negative electrode current collector 8a are connected by welding, thereby forming a welded connection portion 63.

Fabrication of Secondary Battery

Two positive electrode tab groups 40A and two negative electrode tab groups 50A are curved so that the upper side of one electrode assembly 3 in FIG. 9 (the side further to the viewer in FIG. 9) and the upper side of the other electrode assembly 3 (the side closer to the viewer in FIG. 9) cone into contact with each other directly or via another member. As a result, the two electrode assemblies 3 are combined into one unit. The two electrode assemblies 3 are located in an electrode assembly holder 14 consisting of a box-shaped or a bag-shaped insulating sheet.

One positive electrode tab group 40A and the other positive electrode tab group 40A are curved in different directions. One negative electrode tab group 50A and the other negative electrode tab group 50A are curved in different directions.

The two electrode assemblies 3 wrapped in the electrode assembly holder 14 are inserted into the square exterior body 1. The sealing plate 2 and the square exterior body 1 are then welded to seal the opening of the square exterior body 1 with the sealing plate 2. The electrolytic solution is then injected into the square exterior body 1 through the electrolytic solution injection hole 15 provided in the sealing plate 2. After that, the electrolytic solution injection hole 15 is sealed with a sealing member such as a blind rivet. Thus, the square secondary battery 20 is completed.

The thickness of the fluorine-containing coating can be in the range of 0.05 to 5 µm. Note that the thickness of the fluorine-containing coating is preferably less than 1 µm or in the range of 0.1 to 0.8 µm. When the thickness of the fluorine-containing coating is made relatively small, the phenomenon that a coating containing fluorine is peeled off from the end surface of the core body can be suppressed.

When the fluorine-containing coating contains aluminum fluoride as a main component, the thickness of the coating is preferably less than 1 µm, more preferably in the range of 0.05 to 0.8 µm, still more preferably in the range of 0.1 to 0.6 µm. When the thickness of the coating is made relatively small, even if the end surface of the core body comes into contact with an electrode plate of a different polarity, the end surface of the core body is not completely insulated and current can flow between the end surface of the core body and the electrode plate of a different polarity. This avoids the situation where the insulation between the positive electrode plate and the negative electrode plate is maintained only by the coating, which may allow energy to be released when the end surface of the core body comes into contact with an electrode plate of a different polarity.

The protective layer provided on the electrode plate is preferably a layer having lower electrical conductivity than the core body constituting the electrode plate. The protective layer is preferably a layer having lower electrical conductivity than the active material layer. Although the aforementioned embodiment showed the example in which the protective layer is provided on the positive electrode plate, the protective layer may be provided on the negative electrode plate instead.

The protective layer preferably contains a ceramic and a binder. The ceramic may be an oxide, nitride, boride, carbide, silicide, sulfide or the like. The ceramic may be aluminum oxide, boehmite, titanium oxide, silicon oxide, tungsten oxide, or the like. However, this is not necessarily the case. The binder is preferably a resin-based binder. However, this is not necessarily the case. Note that the protective layer does not necessarily contain a ceramic. For example, the protective layer may be a resin layer. The protective layer may be made of a conductive material of a carbon material or the like. Note that the protective layer does not necessarily contain a conductive material.

The positive electrode core body is preferably made of aluminum or an aluminum alloy containing aluminum as a main component. Note that the aluminum alloy is preferably an aluminum alloy with an aluminum content of 90 mass % or more, more preferably an aluminum alloy with an aluminum content of 95 mass % or more.

The negative electrode core body is preferably made of copper or a copper alloy containing copper as a main component. Note that the copper alloy is preferably a copper alloy with a copper content of 95 mass % or more, more preferably a copper alloy with a copper content of 99 mass % or more.

The thickness of the core body is preferably 5 to 30 μM, more preferably 5 to 20 μm.

The aforementioned embodiment showed the example in which the positive electrode protective layer 4c is provided on the positive electrode plate 4. However, the protective layer is not an essential component and is not necessarily provided.

The protective layer and the coating provided on the electrode plate have different structures.

Although the aforementioned embodiment showed the example in which two electrode assemblies are located in the battery case, one or three or more electrode assemblies may be used. The electrode assemblies may be laminated electrode assemblies or wound electrode assemblies.

The details of the configuration of the end portion of the active material layer-free portion have been described for the positive electrode plate in the aforementioned embodiment, and the same configuration can be applied to the negative electrode plate.

Although the example in which the positive electrode current collector and the negative electrode current collector are each composed of two parts has been described in the aforementioned embodiment, the positive electrode current collector and the negative electrode current collector may each be composed of one part.

Known materials can be used for the positive electrode plate, the negative electrode plate, the separator, the electrolyte, and the like.

REFERENCE SIGNS LIST 20 square secondary battery
1 square exterior body
2 sealing plate
2a positive electrode terminal insertion hole
2b negative electrode terminal insertion hole
100 battery case
3 electrode assembly
4 positive electrode plate
4A first side
4a positive electrode core body
4b positive electrode active material layer
4c positive electrode protective layer
4d positive electrode core body exposed portion
4x1, 4x2 protrusion
4y coating
40 positive electrode tab
40A positive electrode tab group
400 positive electrode original plage
401 positive electrode original plate with tabs already formed
5 negative electrode plate
5a negative electrode core body
5b negative electrode active material layer
50 negative electrode tab
50A negative electrode tab group
6 positive electrode current collector
61 first positive electrode current collector
6b second positive electrode current collector
6c thin portion
6d current collector opening
6e current electrode through hole
7 positive electrode terminal
8 negative electrode current collector
8a first negative electrode current collector
8b second negative electrode current collector
8c thin portion
8d current collector opening
9 negative electrode terminal
10 external insulating member
11 internal insulating member
11a solution injection opening
11b tubular part
12 external insulating member
13 internal insulating member
14 electrode assembly holder
15 electrolytic solution injection hole
16 sealed member
17 gas discharge valve
60, 61, 62, 63 welded connection portion

The invention claimed is:

1. A secondary battery electrode plate comprising a metal core body and an active material layer on both major surfaces of the core body, the both major surfaces of the core body being opposite to each other, wherein
the electrode plate has a first side, a second side opposite to the first side, and a tab that protrudes from the first side,
a coating containing fluorine is formed on an end surface of the core body on the first side, the end surface of the core body being connected to the both major surfaces of the core body,
the active material layer is located away from the first side of the electrode plate,
the coating containing fluorine is disposed on a portion of the end surface which is non-coplanar with the major surfaces of the core body,
the coating is a coating containing aluminum fluoride, and
the thickness of the coating is less than 1 μm.

2. The secondary battery electrode plate according to claim 1, wherein the thickness of the core body on the first side is larger than that of a portion of the core body, the portion having the active material layer formed on the portion.

3. The secondary battery electrode plate according to claim 1, wherein the core body is made of aluminum or an aluminum alloy.

4. The secondary battery electrode plate according to claim 1, wherein the coating is a resin coating containing fluorine.

5. The secondary battery electrode plate according to claim 1, wherein the coating is also formed on an end surface of the tab.

6. A secondary battery comprising:
   the electrode plate according to claim 1; and
   another electrode plate having a polarity different from that of the electrode plate.

7. The secondary battery electrode plate according to claim 1, wherein the electrode plate includes, along the first side of the core body, an active material layer-free portion in which the active material layer is not formed, such that the end surface of the core body having the coating thereon is free of the active material layer.

8. The secondary battery electrode plate according to claim 1, wherein the tab is monolithic with the core body.

\* \* \* \* \*